US012509390B2

(12) United States Patent
Jacquet et al.

(10) Patent No.: US 12,509,390 B2
(45) Date of Patent: Dec. 30, 2025

(54) SUBSTRATE PROVIDED WITH A STACK HAVING THERMAL PROPERTIES

(71) Applicant: SAINT-GOBAIN GLASS FRANCE, Courbevoie (FR)

(72) Inventors: Paul Jacquet, Pantin (FR); Véronique Rondeau, Asnieres sur Seine (FR); Elsa Perrin, Paris (FR)

(73) Assignee: SAINT-GOBAIN GLASS FRANCE, Courbevoie (FR)

( * ) Notice: Subject to any disclaimer, the term of this patent is extended or adjusted under 35 U.S.C. 154(b) by 88 days.

(21) Appl. No.: 18/554,412

(22) PCT Filed: Apr. 7, 2022

(86) PCT No.: PCT/FR2022/050648
§ 371 (c)(1),
(2) Date: Oct. 6, 2023

(87) PCT Pub. No.: WO2022/219266
PCT Pub. Date: Oct. 20, 2022

(65) Prior Publication Data
US 2024/0262740 A1 Aug. 8, 2024

(30) Foreign Application Priority Data
Apr. 12, 2021 (FR) ..................... 2103751

(51) Int. Cl.
*B32B 15/04* (2006.01)
*B32B 17/06* (2006.01)
*C03C 17/36* (2006.01)

(52) U.S. Cl.
CPC .......... *C03C 17/3626* (2013.01); *C03C 17/36* (2013.01); *C03C 17/3639* (2013.01); *C03C 17/3644* (2013.01); *C03C 17/3652* (2013.01); *C03C 17/366* (2013.01); *C03C 17/3681* (2013.01); *C03C 2217/216* (2013.01); *C03C 2217/256* (2013.01); *C03C 2217/281* (2013.01); *C03C 2217/73* (2013.01); *C03C 2217/944* (2013.01); *C03C 2218/156* (2013.01)

(58) Field of Classification Search
CPC .................................................. C03C 17/366
USPC ....................................... 428/426, 432, 434
See application file for complete search history.

(56) References Cited

U.S. PATENT DOCUMENTS

| | | | | |
|---|---|---|---|---|
| 10,745,318 B2* | 8/2020 | Lorenzzi | ............ | C03C 17/3652 |
| 10,815,147 B2* | 10/2020 | Lorenzzi | ............... | C23C 14/185 |
| 10,843,962 B2* | 11/2020 | Lorenzzi | ........... | B32B 17/10045 |
| 11,208,349 B2* | 12/2021 | Ongarello | ........... | C03C 17/3668 |
| 11,390,559 B2* | 7/2022 | Jacquet | ............... | C03C 17/3626 |
| 12,151,967 B2* | 11/2024 | Bronstein | ........... | C03C 17/3644 |
| 2011/0268941 A1* | 11/2011 | Fischer | ............... | C03C 17/3671 |
| | | | | 204/192.1 |
| 2012/0177900 A1* | 7/2012 | Laurent | ............... | C03C 17/3639 |
| | | | | 428/213 |
| 2015/0004383 A1* | 1/2015 | Sandre-Chardonnal | ..................... | |
| | | | | C03C 17/361 |
| | | | | 428/213 |
| 2018/0194675 A1* | 7/2018 | Lorenzzi | ................. | B32B 7/023 |
| 2018/0194676 A1* | 7/2018 | Lorenzzi | ........... | B32B 17/10045 |
| 2021/0017071 A1* | 1/2021 | Ongarello | ........... | C03C 17/3639 |
| 2021/0395138 A1* | 12/2021 | Jacquet | ............... | C03C 17/3652 |

FOREIGN PATENT DOCUMENTS

| | | |
|---|---|---|
| EP | 0 645 352 A1 | 3/1995 |
| WO | WO 2013/079400 A1 | 6/2013 |
| WO | WO 2014/177798 A1 | 11/2014 |
| WO | WO 2017/006027 A1 | 1/2017 |
| WO | WO 2017/006029 A1 | 1/2017 |
| WO | WO 2019/171002 A1 | 9/2019 |
| WO | WO 2020/021033 A1 | 1/2020 |
| WO | WO 2020/089545 A1 | 5/2020 |

OTHER PUBLICATIONS

International Search Report as issued in International Patent Application No. PCT/FR2022/050648, dated Jul. 8, 2022.

* cited by examiner

*Primary Examiner* — Lauren R Colgan
(74) *Attorney, Agent, or Firm* — Pillsbury Winthrop Shaw Pittman LLP

(57) ABSTRACT

A transparent substrate provided with a stack of thin layers includes successively, from the substrate, an alternating arrangement of at least three functional metal layers and four antireflective coatings, each antireflective coating including at least one dielectric layer; the thicknesses and the nature of the different layers being adapted for the production of new solar protection glazing, to be tempered, having high thermal performance (S of approximately 2.1 for LT of the order of 60%) and a neutral color, the colors thereof being stable at an angle.

24 Claims, No Drawings

SUBSTRATE PROVIDED WITH A STACK HAVING THERMAL PROPERTIES

CROSS-REFERENCE TO RELATED APPLICATIONS

This application is the U.S. National Stage of PCT/FR2022/050648, filed Apr. 7, 2022, which in turn claims priority to French patent application number 2103751 filed Apr. 12, 2021. The content of these applications are incorporated herein by reference in their entireties.

The invention relates to a transparent substrate coated with a stack of thin layers comprising several functional layers which can act on solar radiation and/or long-wave infrared radiation. The invention also relates to glazings comprising these substrates and to the use of such substrates for manufacturing thermal insulation glazings and/or solar protection glazings.

These glazings may be designed to equip both buildings and vehicles, with a view notably to decreasing the air conditioning load and/or to preventing excessive overheating (glazings referred to as "solar control glazings") and/or to reducing the quantity of energy dissipated toward the outside (glazings referred to as "low-emissive glazings") driven by the ever-increasing areas of glazed surfaces in buildings and in vehicle passenger compartments.

Glazings comprising transparent substrates coated with a stack of thin layers comprising at least three metallic functional layers, each positioned between two dielectric coatings, are known. These stacks are generally obtained by a sequence of depositions carried out by a technique which uses a vacuum, such as cathode sputtering, optionally assisted by magnetic field.

The use of a stack-based substrate comprising at least three metal layers makes it possible to optimize the solar protection of the glazings incorporating them, which may result in a reduction in the solar factor (g) and an increase in selectivity (s). These glazings are said to be selective. According to the invention:
  solar factor "g" is understood to mean the ratio of the total energy entering the premises through the glazing to the incident solar energy,
  selectivity "s" is understood to mean the ratio of the light transmission to the solar factor LT/g.

In this type of stack, each functional layer is disposed between two antireflective coatings each including, in general, several antireflective or dielectric layers which each consist of an antireflective material of the nitride type, notably silicon or aluminum nitride, and/or of the oxide type. From an optical perspective, the aim of these coatings which surround the functional layer is "to anti-reflect" this functional layer.

The choice of the use of a stack with three metal layers influences the light transmission of the substrates and/or of the glazings incorporating said stacks. Depending on the climates of the countries where these glazings are to be incorporated, the performance in terms of light transmission and solar factor that are to be achieved may vary within a certain range. The light transmission must be low enough to eliminate glare and high enough so that the reduction in the amount of light penetrating inside the space delimited by said glazing does not make it necessary to use artificial light. For example, insulating glazings having a high selectivity of about 2 are advantageously used as glazings intended to be exposed to heavy sunshine.

A compromise has to be found between the optical and thermal performances, the transparency and the aesthetic appearance.

For warm-climate countries where the energy expenditure in air conditioning is predominant, g must be low. According to the invention, it is therefore sought to minimize the solar factor and to increase the selectivity, while keeping a light transmission suitable for allowing good insulation and good vision.

Patent application EP 0 645 352 discloses, for example, a transparent substrate comprising a stack of thin layers including in particular at least three layers of silver separated by layers of dielectric material. The thicknesses of the silver layers increase as a function of the distance from the substrate. The glazings comprising these substrates, although exhibiting a pleasant aesthetic appearance, do not exhibit a selectivity greater than 2. However, it is extremely difficult to retain both a good selectivity and esthetically acceptable colors in transmission and in reflection with in particular an appearance of the glazing seen from the inside of neutral color.

Documents WO 2017/06027 and WO 2014/177798 also disclose a stack with three layers of Ag, the thicknesses of which are increasing. The targeted light transmission is respectively on the order of 40 and 50%, which is less than the target of the present invention.

Document WO 2017/006029 also discloses a stack with three layers of Ag, the thicknesses of which are increasing. The targeted light transmission is on the order of 70%, and the solar factor is of the order of 30-34%, which is greater than the target of the present invention.

Document WO 2019/171002 also discloses a stack with three layers of Ag, the thicknesses of which are increasing. The glazings exhibit good selectivity (of the order of 2.1). The external (RLext 15%) and internal (RLInt 18%) light reflectance values are greater than the values targeted by the present invention.

Document WO2013/079400 also discloses a stack with three layers of Ag, the thicknesses of which are increasing. The aesthetic appearance is not optimal. In transmission, the values b* are positive or not sufficiently negative.

The aim of the invention is therefore to overcome these disadvantages by developing a substrate comprising a stack comprising at least three layers with infrared reflection properties, in particular metallic ones, and which has a high selectivity (preferably greater than 2.1), that is to say a ratio LT/g that is as high as possible for a value of LT on the order of 55 to 65%, while guaranteeing an appearance, mainly in external reflectance, (but also in internal reflectance and in transmission) which is pleasant to the eye, that the substrate is used as monolithic glazing, incorporated into an insulating multiple glazing of the double glazing type, or even in a laminated glazing. External reflectance values (RLext) less than 14% and internal reflectance (RLInt) less than 17% are also desired.

These properties are preferably obtained after one (or more) high-temperature thermal treatment of the bending and/or tempering and/or annealing type. The appearance pleasant to the eye is expressed by colors being obtained in reflection, both from the outside and from the inside, which are more neutral, in the blue-green range, and which in addition vary little according to the angle of observation. The aim is in particular to increase the a* value in external reflectance and to reduce the b* value in transmission while retaining high selectivity.

The invention relates to a transparent substrate comprising a stack of thin layers successively including from the substrate an alternation of at least three functional metal layers, in particular functional layers based on silver or on a metal alloy containing silver, and of at least four antireflective coatings, so that each functional metal layer is arranged between two antireflective coatings, each antireflective coating including at least one dielectric layer, characterized in that:

the thicknesses of the first three functional metal layers starting from the substrate increase as a function of the distance from the substrate, and in that the stack includes:

at least one absorbent layer in the first antireflective coating, or a blocking underlayer directly in contact with the first functional metal layer, the ratio of the physical thickness of the second functional layer to the physical thickness of the first functional layer (Ag2/Ag1) being between 1.35 and 1.90, including these values, preferably between 1.45 and 1.75, preferably between 1.55 and 1.65, including these values, the third functional metal layer has a physical thickness preferably of between 17.5 and 24.0 nm.

The applicant has discovered that the choice of a specific distribution of thickness for the three silver layers, in particular with a third silver layer having a thickness of 17.5 and 24.0 nm and a particular ratio of Ag2/Ag1 at least between 1.35 and 1.90, contributes to achieving the desired properties. This adjustment of the thicknesses of the silver layers makes it possible to obtain a more neutral appearance in external reflectance resulting in less green colors at 0° and at an angle, that is to say negative a* values but closer to 0 and a less yellow appearance in transmission while retaining high selectivity.

For thicknesses as claimed for the third functional layer, the choice of an Ag2/Ag1 ratio of between 1.35 and 1.90, is necessary to achieve neutrality in external reflectance and in transmission. Better results are obtained for an Ag2/Ag1 ratio of between 1.5 and 1.7. Likewise, an Ag3/Ag1 ratio of less than 2.4 contributes to achieving negative b* values in transmission.

The distribution of the thicknesses of the silver layers in the stack is essential to achieve the required properties of neutrality and of selectivity.

Preferably, the at least one absorbent layer or the blocking underlayers is selected from metallic layers based on a metal or on a metal alloy, metal nitride layers, and metal oxynitride layers, preferably of one or several elements selected from titanium, nickel, chromium and niobium, and even more preferably among layers of Ti, TiN, Nb, NbN, Ni, NiN, Cr, CrN, NiCr, or NiCrN.

In particular, the thickness of the at least one absorbent layer or the blocking underlayer is comprised from 0.1 to 2.0 nm, preferably between 0.3 and 1.5 nm.

In a preferred embodiment, the stack includes an alternation of three functional metal layers, in particular based on silver and on four antireflective coatings, also called dielectric coatings.

Advantageously, the first functional metal layer has a physical thickness of between 6 and 11 nm, preferably between 7 and 10 nm, and even more preferably between 8.5 and 9.5 nm, inclusive.

Advantageously, the second functional metal layer has a physical thickness of between 12 and 17 nm, preferably between 13 and 16.5 nm, inclusive.

Advantageously, the third functional metal layer has a physical thickness of between 17.8 and 23.0 nm, preferably between 18.0 and 22.0 nm, inclusive.

Each functional metal layer can be in contact with at least one blocking layer, in particular each functional metal layer is in contact with a blocking underlayer denoted based on the position relative to the substrate, first, second and third blocking underlayer.

The total thickness of the blocking layers is generally between 3 and 9 nm, including these values, preferably between 4 and 6 nm.

Advantageously, the first three functional metal layers, corresponding to the first (Ag1), the second (Ag2), and third (Ag3) metal functional layer defined starting from the substrate, satisfy the following characteristic:

the ratio of the thickness of the third metal layer to the thickness of the second functional metal layer (Ag3/Ag2) is greater than 1.05, preferably between 1.10 and 1.50, and satisfies the following characteristic:

the ratio of the thickness of the third metal layer to the thickness of the first functional metal layer (Ag3/Ag1) is comprised between 1.50 and 2.40, preferably between 1.60 and 2.30 inclusive.

Preferably, the antireflective coatings corresponding to the first (M1), second (M2), third (M3) antireflective coating and fourth (M4) antireflective coating defined starting from the substrate have:

a ratio (M3/M2) of the optical thickness of the third coating to the optical thickness of the second coating which is between 0.9 and 2.2, inclusive, preferably between 1.0 and 2.0 and preferably, a ratio (M3/M4) of the optical thickness of the third coating to the optical thickness of the fourth coating which is between 2.2 and 3.1, inclusive, preferably between 2.35 and 3.00 inclusive.

In particular, the antireflective coatings comprise at least one dielectric layer based on oxide or on nitride of several elements chosen from silicon, aluminum, tin or zinc.

Preferably, each antireflective coating includes at least one dielectric layer having a barrier function based on silicon compounds chosen from oxides, such as $SiO_2$, silicon nitrides $Si_3N_4$ and oxynitrides $SiO_xN_y$, optionally doped using at least one other element, such as aluminum.

Advantageously, each antireflective coating includes at least one dielectric layer having a stabilizing function based on crystalline oxide, in particular based on zinc oxide, optionally doped using at least one other element, such as aluminum.

According to a particular embodiment, the substrate comprises a stack, defined starting from the transparent substrate, comprising:

a first antireflective coating comprising at least one dielectric layer having a barrier function and at least one dielectric layer having a stabilizing function, a first blocking underlayer, a first functional layer, a first blocking overlayer, a second antireflection coating comprising at least one dielectric layer having a barrier function and at least one dielectric layer having a stabilizing function, potentially a third blocking underlayer, a second functional layer, a second blocking overlayer, a third antireflective coating comprising at least one dielectric layer having a barrier function and at least one dielectric layer having a stabilizing function, potentially a third blocking underlayer, a third functional layer,
a third blocking overlayer,
a fourth antireflective coating comprising at least one dielectric layer having a stabilizing function and at least one dielectric layer having a barrier function.

The present invention also relates to a glazing comprising a transparent substrate as described above, characterized in that it is in the form of a double glazing, a laminated glazing, an asymmetric glazing or a multiple glazing of the double glazing type.

EXAMPLES

I. Preparation of the Substrates: Stacks, Deposition Conditions and Heat Treatments Stacks of thin layers defined below are deposited on substrates made of clear soda-lime glass with a thickness of 6 mm.

In the examples of the invention:
the functional layers are silver (Ag) layers,
the blocking layers are metallic layers made of nickel-chromium alloy (NiCr),
the barrier layers are based on silicon nitride, doped with aluminum ($Si_3N_4$: Al) or based on a mixed oxide of zinc and tin (SnZnOx),
the stabilizing layers are made of zinc oxide (ZnO).

The conditions for deposition of the layers, which were deposited by sputtering ("magnetron cathode" sputtering), are summarized in Table 1.

TABLE 1

| Tab. 1 | Target used | Deposition pressure | Gas | n 550 nm |
|---|---|---|---|---|
| $Si_3N_4$ | Si:Al at 92:8% by weight | $3.2*10^{-3}$ mbar | Ar/(Ar + N2) at 55% | 2.18 |
| ZnO | Zn:Al at 98:2% by weight | $1.8*10^{-3}$ mbar | Ar/(Ar + O2) at 63% | 1.91 |
| SnZnOx | Sn:Zn (60:40% by wt) | $1.5*10^{-3}$ mbar | Ar 39% – $O_2$ 61% | 2.12 |
| TiZrO | TiZrOx | $2-4*10^{-3}$ mbar | Ar 90% – $O_2$ 10% | 2.32 |
| NiCr | Ni (80 at. %):Cr (20 at. %) | $2-3 \times 10^{-3}$ mbar | Ar at 100% | — |
| Ag | Ag | $3*10^{-3}$ mbar | Ar at 100% | — |

At. = atomic

Table 2 lists the materials and the physical thicknesses in nanometers (unless otherwise indicated) for each layer making up the stacks as a function of their positions with respect to the substrate carrying the stack (final line at the bottom of the table) as well as the total optical thicknesses of the antireflective coatings (M1, M2, M3 and M4)

Counterexamples

Example 4 of document WO 2017/006027 is taken as comparative example 1. The stack has an underblocker under the first layer of Ag, but the ratio Ag2/Ag1 is greater than 1.90.

Example Inv. AT of document WO 2014/177798 is taken as comparative example 2. The stack does not have an underblocker under the first layer of Ag, nor an absorbent layer in the first dielectric coating

TABLE 2

|  | Inv1 | Inv. 2 | Inv. 3 | Inv4 | Comp 1 | Comp 2 |
|---|---|---|---|---|---|---|
| DC: M4 | 60.1 | 60.1 | 76.9 | 76.9 | 92.9 | 52.4 |
| TiZrOx | 2.0 | 2.0 | 5.0 | 5.0 | 2.0 |  |
| $Si_3N_4$ | 18.5 | 18.5 | 18.0 | 18.0 | 35.8 | 20.0 |
| ZnO | 9.5 | 9.5 | 7.0 | 7.0 | 8.0 | 6.0 |
| BL: NiCr | 1.2 | 1.0 | 1.0 | 1.0 | 1.2 | 0.8 |
| FL: Ag3 | 17.9 | 20.5 | 20.6 | 20.6 | 17.6 | 20.7 |
| BL: NiCr | 0.4 | 0.4 | 0.0 | 0.0 | 0.5 | 0.0 |
| DC: M3 | 146.6 | 148.4 | 144.2 | 144.2 | 182.4 | 123.1 |
| ZnO | 9.9 | 9.9 | 7.0 | 7.0 | 8.0 | 6.0 |
| SnZnO | 10.3 | 10.3 | 8.0 | 8.0 | / | 15.0 |
| $Si_3N_4$ | 42.8 | 43.7 | 49.0 | 49.0 | 74.5 | 35.0 |
| ZnO | 10.8 | 10.8 | 8.0 | 8.0 | 8.0 | 6.0 |
| BL: NiCr | 1.3 | 1.3 | 1.0 | 1.0 | 0.5 | 2.5 |
| FL: Ag2 | 15.7 | 16.0 | 16.4 | 16.4 | 16.7 | 16.3 |
| BL: NiCr | 0.5 | 0.5 | 0.0 | 0.0 | 0.5 | 0.0 |
| DC: M2 | 119.4 | 83.2 | 126.8 | 126.8 | 140.4 | 127.4 |
| ZnO | 10.3 | / | 8.0 | 8.0 | 8.0 | 6.0 |
| $Si_3N_4$ | 38.3 | 40.6 | 47.0 | 47.0 | 53.8 | 51.0 |
| ZnO | 11.2 | / | 8.0 | 8.0 | 8.0 | 6.0 |
| BL: NiCr | 2.1 | 2.2 | 1.0 | 1.0 | 2.2 | 1.6 |
| FL: Ag1 | 9.3 | 9.2 | 10.7 | 10.7 | 8.1 | 8.5 |
| BL: NiCr | 0.8 | 0.8 | 0.5 | / | 0.5 | 0.0 |
| DC: M1 | 95.1 | 14.0 | 76.9 | 76.9 | 120.1 | 106.4 |
| ZnO | 9.5 | / | 7.0 | 7.0 | 8.0 | 6.0 |
| NiCr | / | / | / | 0.5 | / | / |
| SnZnO | 11.4 | / | / | / | / | / |
| $Si_3N_4$ | 5.8 | 6.8 | 31.0 | 31.0 | 51.5 | 50.0 |
| SiON | 25.6 | / | / | / | / | / |
| Substrate (mm) | 6 | 6 | 6 | 6 | 6 | 6 |

Table 3 below summarizes the characteristics linked to the thicknesses of the functional layers, antireflective coatings, and blocking layers.

TABLE 3

|  | Inv1 | Inv. 2 | Inv. 3 | Inv4 | Comp 1 | Comp 2 |
|---|---|---|---|---|---|---|
| Ratio of functional layer thicknesses |  |  |  |  |  |  |
| Ag2/Ag1 | 1.69 | 1.70 | 1.53 | 1.53 | 2.07 | 1.92 |
| Ag3/Ag2 | 1.14 | 1.29 | 1.26 | 1.26 | 1.05 | 1.27 |
| Ag3/Ag1 | 1.92 | 2.24 | 1.93 | 1.93 | 2.17 | 2.44 |
| Total thicknesses of the functional layers (Ag1 + Ag 2 + Ag3) | 42.9 | 45.6 | 47.7 | 47.7 | 42.4 | 45.5 |
| Ratio of antireflective coating thicknesses |  |  |  |  |  |  |
| AR3/AR2 | 1.2 | 1.8 | 1.1 | 1.1 | 1.3 | 1.0 |
| AR3/AR4 | 2.4 | 2.5 | 2.9 | 2.9 | 2.0 | 2.3 |
| Total thickness OB1 + OB2 + OB3 | 4.6 | 4.5 | 3.0 | 3.0 | 3.9 | 4.9 |
| Total thickness UB1 + UB2 + UB3 | 1.7 | 1.7 | 0.5 | 0.5 | 1.5 | 0.0 |

II. "Solar Control" and Colorimetry Performance

Table 4 lists the main optical characteristics measured for substrates integrated into a double glazing with the structure: 6-mm glass/16-mm interlayer space filled with 90% argon/4-mm glass, the stack being positioned on face 2 (the face 1 of the glazing being the outermost face of the glazing, as usual).

For these double glazings,

LT indicates: the light transmission in the visible region in %, measured according to the D65 illuminant at 10° Observer;

a*T and b*T indicate the colors in transmission a* and b* in the LAB system, measured according to the illuminant D65 at 10° Observer and measured perpendicularly to the glazing;

RLext indicates: the light reflection in the visible region in %, measured according to the illuminant D65 at 10° Observer on the side of the outermost face, the face 1;

a*Rext and b*Rext indicate the colors in reflection a* and b* in the LAB system, measured according to the illuminant D65 at 10° Observer on the side of the outermost face and measured thus perpendicularly to the glazing;

RLint indicates: the light reflection in the visible region in %, measured according to the illuminant D65 at 10° Observer on the side of the innermost face, the face 4;

a*Rint and b*Rint indicate the colors in reflection a* and b* in the LAB system, measured according to the illuminant D65 at 10° Observer on the side of the innermost face and measured thus perpendicularly to the glazing, a*g60° and b*g60° indicate the colors in reflection a* and b* in the LAB system measured according to the illuminant D65 at 10°. In a simple glazing configuration, the observer being on the outside face and positioned at an angle of 60° relative to the normal to the glazing.

TABLE 4

|  | Inv1 | Inv. 2 | Inv. 3 | Inv4 | Comp 1 | Comp 2 |
|---|---|---|---|---|---|---|
| LT % | 59.1 | 60.0 | 60.1 | 60.0 | 40.0 | 50.5 |
| g | 29.1 | 29.1 | 29.2 | 29.2 | 19.0 | 22.7 |
| S | 2.03 | 2.06 | 2.06 | 2.06 | 2.11 | 2.22 |
| LRext % | 11.4 | 11.6 | 11.3 | 11.2 | 12.0 | 17.1 |
| RLint % | 14.7 | 15.4 | 15.9 | 15.8 | 20.0 | 20.3 |
| Color in transmission |  |  |  |  |  |  |
| a*T | −7.0 | −6.8 | −4.9 | −5.0 | −5.7 | −8.4 |
| b*T | −2.3 | −2.0 | −0.6 | −0.6 | 2.0 | 0.2 |
| Color in ext reflection |  |  |  |  |  |  |
| a*Rext | −1.7 | −2.4 | −2.5 | −1.8 | −2.8 | −6.3 |
| b*Rext | −3.8 | −5.7 | −5.6 | −6.2 | −9.0 | −8.9 |
| Color in int reflection |  |  |  |  |  |  |
| a*Rint | −6.3 | −3.0 | −6.9 | −6.5 | −13.2 | −7.7 |
| b*Rint | −1.9 | −2.0 | 1.6 | 1.5 | −13.5 | −7.1 |
| Color at an angle |  |  |  |  |  |  |
| a*g60° | 1.7 | −0.4 | 0.5 | 1.1 | −1.2 |  |
| b*g60° | −2.2 | −2.2 | −1.1 | −1.3 | −2.4 |  |

According to the invention, it is possible to produce a novel solar-control glazing, to be tempered, having high thermal performance (S approximately 2.1), of neutral color and whose colors are stable at an angle, that is, when the observer moves from the perpendicular to the glazing toward an observation at an angle away from the perpendicular.

In particular, the inventors have observed that it is possible to obtain a* values in external reflectance greater than those of the known similar glazings (of the order of −1.7 to −2.5) and b* values in transmission lower than those of the known similar glazings (of the order of −0.6 to −2.3, etc.) while retaining a high selectivity on the order of 2.1, for a transmission on the order of 60%.

The examples of the invention satisfying Ag3 of between 17.5 and 24.0 nm and Ag2/Ag1 of between 1.35 and 1.90 make it possible to obtain both negative and near-zero a* values in external reflectance and negative b* values in transmission while maintaining high selectivity.

The glazings according to the invention therefore offer good solar protection in a range of light transmissions that are particularly suitable for equipping buildings exposed to moderately heavy sunshine.

The combination of the various claimed features also made it possible to reduce the haze that appears after heat treatment.

The invention claimed is:

1. A transparent substrate comprising a stack of layers successively including from the substrate an alternation of at least first, second and third functional metal layers, and of at least first, second, third and fourth antireflective coatings, so that each functional metal layer is arranged between two antireflective coatings, each antireflective coating comprising at least one dielectric layer, wherein:
    thicknesses of the first, second and third functional metal layers starting from the substrate increase as a function of a distance from the substrate,
    the stack comprises:
        at least one absorbent layer in the first antireflective coating, or a blocking underlayer directly in contact with the first functional metal layer,
    a ratio of a physical thickness of the second functional metal layer to a physical thickness of the first functional metal layer being between 1.35 and 1.90, inclusive,
    the third functional metal layer has a physical thickness between 17.5 and 24.0 nm,
    wherein a ratio of an optical thickness of the first antireflective coating to an optical thickness of the second antireflective coating is below 0.8,
    wherein the transparent substrate has a visible light transmission between 55 and 62%, an external reflectance values (RLext) of less than 14% and an internal reflectance (RLInt) of less than 17%.

2. The substrate according to claim 1, wherein the at least one absorbent layer or the blocking underlayer is selected from metallic layers based on a metal or on a metal alloy, metal nitride layers, and metal oxynitride layers.

3. The substrate according to claim 1, wherein a thickness of the at least one absorbent layer or the blocking underlayer is from 0.1 to 2.0 nm.

4. The substrate according to claim 1, wherein the first, second and third functional metal layers are the only functional metal layers in said stack.

5. The substrate according to claim 1, wherein the first functional metal layer has a physical thickness between 6 and 11 nm, inclusive.

6. The substrate according to claim 1, wherein the second functional metal layer has a physical thickness between 12 and 17 nm, inclusive.

7. The substrate according to claim 1, wherein the third functional metal layer has a physical thickness between 17.8 and 23.0 nm, inclusive.

8. The substrate according to claim 1, wherein each functional metal layer is in contact with at least one blocking layer.

9. The substrate according to claim 1, wherein each functional metal layer is in contact with a blocking underlayer denoted based on the position relative to the substrate, first, second and third blocking underlayer.

10. The substrate according to claim 1, wherein the first, second and third functional metal layers defined starting from the substrate and satisfy the following characteristic:
a ratio of the thickness of the third functional metal layer to the thickness of the second functional metal layer is greater than 1.05.

11. The substrate according to claim 1, wherein the first, second and third functional metal layers defined starting from the substrate and satisfy the following characteristic:
a ratio of the thickness of the third functional metal layer to the thickness of the first functional metal layer is between 1.50 and 2.40 inclusive.

12. The substrate according to claim 1, wherein the second and third antireflective coating defined starting from the substrate have a ratio of an optical thickness of the third antireflective coating to an optical thickness of the second antireflective coating which is between 0.9 and 2.2, inclusive.

13. The substrate according to claim 1, wherein the first, second, third and fourth antireflective coatings comprise at least one dielectric layer based on oxide or on nitride of one or several elements chosen from silicon, aluminum, tin or zinc.

14. The substrate according to claim 1, wherein each of the first, second, third and fourth antireflective coatings includes at least one dielectric layer having a barrier function based on silicon compounds chosen from oxides, silicon nitrides $Si_3N_4$ and oxynitrides $SiO_xN_y$, optionally doped using at least one other element.

15. The substrate according to claim 1, wherein each antireflective coating includes at least one dielectric layer having a stabilizing function based on crystalline oxide, optionally doped using at least one other element.

16. The substrate according to claim 1, wherein the stack of layers defined starting from the transparent substrate, comprises:
the first antireflective coating comprising at least one dielectric layer having a barrier function and at least one dielectric layer having a stabilizing function,
a first blocking underlayer,
the first functional metal layer,
a first blocking overlayer,
the second antireflection coating comprising at least one dielectric layer having a barrier function and at least one dielectric layer having a stabilizing function,
the second functional metal layer,
a second blocking overlayer,
the third antireflective coating comprising at least one dielectric layer having a barrier function and at least one dielectric layer having a stabilizing function,
the third functional metal layer,
a third blocking overlayer,
the fourth antireflective coating comprising at least one dielectric layer having a stabilizing function and at least one dielectric layer having a barrier function.

17. A glazing comprising a transparent substrate according to claim 1, wherein the glazing is a double glazing, a laminated glazing, an asymmetric glazing or a multiple glazing of the double glazing.

18. The substrate according to claim 1, wherein the first, second and third functional metal layers are based on silver or a metal alloy containing silver.

19. The substrate according to claim 1, wherein the ratio of the physical thickness of the second functional layer to the physical thickness of the first functional layer is between 1.45 and 1.75.

20. The substrate according to claim 1, wherein the at least one absorbent layer or the blocking underlayers is selected from layers of Ti, TiN, Nb, NbN, Ni, NiN, Cr, CrN, NiCr, or NiCrN.

21. The substrate according to claim 1, wherein the substrate has a selectivity greater than 2.0.

22. The substrate according to claim 1, comprising at least one blocking overlayer directly in contact with at least one of the first, second and third functional metal layers, and wherein a total thickness of all blocking overlayers and all blocking underlayers in the stack is from 3 nm to 9 nm.

23. The substrate according to claim 22, wherein the total thickness of all blocking overlayers and all blocking underlayers in the stack is from 4 nm to 9 nm.

24. The substrate according to claim 23, wherein the total thickness of all blocking overlayers and all blocking underlayers in the stack is from 6 nm to 9 nm.

* * * * *